Patented Aug. 8, 1944

2,355,065

UNITED STATES PATENT OFFICE 2,355,065

PAPER COATING

Herbert F. Gardner, Chicago, Ill., assignor to Stein, Hall Manufacturing Company, Chicago, Ill., a corporation of Delaware No Drawing. Application August 3, 1940, Serial No. 351,099

6 Claims. (Cl. 106—205)

This invention relates to paper coating and more particularly to new and improved amylaceous paper coating compositions.

The expression "paper coating," as employed herein, refers to that art wherein an adhesive such as casein, glue, oxidized starch, or the like, is mixed with a mineral material such as clay, calcium carbonate, satin white, blank fixe, or other pigment, with or without solubilizing agents where necessary, for example, borax and soda ash, to dissolve the casein, or with or without other auxiliary materials to form with water a mixture known as the "coating color," or the "paper coating composition." The coating color is spread out on the paper in a thin film by various methods, for example, by means of brushes or rolls. The film is dried and the paper is then calendered and rolled in the usual manner.

Coated papers were originally developed in response to a demand for a smooth paper for half tone printing. In this process the picture is made up of minute dots and hence, the smoother the paper the more faithful will be the reproduction of the picture. It is desirable to keep the percentage of adhesive as low as possible, because high amounts have adverse effects on color, opacity, ink absorption and other properties, but on the other hand, sufficient adhesive must be present to prevent the pigments from being picked off by tacky inks.

The starchy materials now being used in making coating colors or paper coating compositions are ordinarily either oxidized starches or enzyme treated starches. Starch degeneration products such as dextrines are normally unsuitable for making coating colors, because the degeneration of the starch causes the loss of desirable coating characteristics such as adhesive strength and flow.

One of the objects of the present invention is to provide a new and improved type of coating color or paper coating composition, which is less expensive than many of those now on the market, employing as an adhesive base a starch degeneration product.

Another object of the invention is to provide a new and improved method of coating paper in which the coating color contains a starch degeneration product which gives equal and sometimes superior results to the usual starch adhesive at a lower cost.

Another object of the invention is to provide a new and improved coating color and a new and improved method of coating highly sized papers wherein a coating color is employed containing a corn-starch degeneration product. Other objects of the invention will appear hereinafter.

These objects are accomplished in accordance with this invention by coating paper with a paper coating composition or coating color containing a coating pigment and as an adhesive base material a relatively low soluble starch degeneration product herein referred to as a "low soluble starch gum." The preferred adhesive base material employed in accordance with the invention might be defined as a "white starch gum." This is a term which, although new, clearly defines the adhesive base.

The starch gums employed in accordance with this invention are obtained by the substantially dry conversion of raw or undegenerated starches at relatively high temperatures, preferably within the range from about 350°–450° F., although somewhat lower or higher temperatures may be used. As is well known, the ordinary dextrinization of a starch is carried out in the presence of a mineral acid. The preparation of a starch gum for the purpose of the present invention is carried out in the presence of no acid, or only a limited quantity of a mineral acid, say, approximately less than 0.1%. The mineral acid must be diluted to a point where it will not gelatinize the starch, otherwise dark grits will be formed which may be too small to be screened. Furthermore, the mineral acid should not be a dehydrating acid because a dehydrating acid like sulphuric acid is unsuitable even if diluted. Small amounts of organic acid such as formic acid, or acetic acid, may be used without departing from the invention. The time of conversion may vary depending upon the temperature of the heating and the nature of the conversion apparatus. Thus, it might require a longer time to convert a large quantity of material than a smaller quantity. When the temperature is lowered, the time of conversion is lengthened, and when the temperature is raised, the time of conversion is shortened. At too high a temperature there is danger of darkening the product. The white starch gum which represents a preferred type of adhesive base for use in accordance with the present invention, is taken from the conversion drum at a time just before the color change from white to brown in the conversion normally occurs.

It is possible to make starch gums which have a relatively high solubility. These gums are obtained by longer periods of conversion and are brown in color. The starch gums employed in accordance with the present invention, however, have a relatively low water solubility, preferably within the range of about 1% to about 20% in distilled water at a temperature of 25° C.

The viscosity limits of the adhesive base materials employed in making coating colors in accordance with the present invention may be described by the proportions of the adhesive base required to give a given viscosity reading on a Stormer viscosimeter at a temperature of 75° F., using a 500 gram weight and the high viscosity cup. The viscosity characteristic of the adhesive base materials employed in accordance with this invention is such that 1 part of the starch gum mixed with 2 parts to 7½ parts of water will give a viscosity reading of 30 seconds on a Stormer viscosimeter when tested in the manner previously described. For example, where the solubility of the starch gum is, say, 20%, it will require about 2 parts of water per part of starch gum to give a viscosity reading of 30 seconds. If the solubility is lower, the amount of water required is proportionately more, and where the solubility is around 1%, it will require about 7½ parts of water to give a viscosity characteristic of 30 seconds.

The starch gum employed as an adhesive base in accordance with this invention may be made by heating any starch in a steel drum by means of steam or hot oil circulating through a jacket while continually mixing the starch by means of a suitable stirrer or agitator, for example, by the rotation of a spiral steel ribbon. The time required to obtain the desired viscosity varies, depending upon the temperature, the kind and amount of acid added, if any is added, and the size and shape of the drum. The size and shape of the drum affect the product mainly through differences in the rate of heat transfer. Thus, in a small laboratory converter where the heating surface is larger compared to the amount of starch than in a commercial converter, a satisfactory product can be made in 2 hours as compared to 6 hours in a large commercial drum.

The invention will be further illustrated but is not limited by the following examples, in which quantities are stated in parts by weight unless otherwise indicated.

Example I

A starch conversion was made by spraying 2000 lbs. of corn-starch with 570 cc. of 18° Bé. hydrochloric acid dissolved in 1000 cc. of water. After the spraying the starch was dropped into an oil heated drum and mixed continuously while the oil was maintained at a temperature of approximately 400° F. After 6 or 7 hours the product had the desired viscosity. The change in viscosity took place most rapidly just as the starch began to darken in color. When the correct viscosity was obtained the starch was dropped into a large water jacketed cooler equipped with an agitator. Here it was cooled to room temperature or cool enough to stop any further action. The product at this point was low in moisture, but upon standing took up moisture from the air until the moisture content was approximately 6% to 8%.

The desired viscosity was ascertained by taking samples of the product during the conversion and subjecting them to a viscosity test of the type previously described. The final product, when mixed with 2½ parts of water, heated to 190° F. then cooled to 75° F. gave a viscosity of approximately 30 seconds on a Stormer viscosimeter using a 500 gram weight and the high viscosity cup. Since the Stormer viscosimeter is a standard instrument, it need not be described.

Example II

An adhesive base material for the coating color was prepared as in Example I except that 2000 lbs. of Royal tapioca flour were employed instead of the corn-starch and the tapioca was sprayed with 700 cc. of 18° Bé. hydrochloric acid in 2000 cc. of water. The other conditions were the same as in Example I.

Example III

The adhesive base for the coating color was prepared as in Example I except that 2000 lbs. of imported potato starch were used instead of the corn-starch and the potato starch was sprayed with 500 cc. of 18° Bé. hydrochloric acid dissolved in 1000 cc. of water. The other conditions were as described in Example I.

It might be mentioned that the acid requirements, if any acid is used, will vary slightly in all starches due to environment, season harvested, rainfall, natural acidity, changes in storage, and unknown causes.

Example IV

The preparation of a coating color containing a starch gum of the type described in Examples I, II and III as the predominant adhesive base may be carried out as follows.

Approximately 180 lbs. of any of the products from Examples I, II or III were suspended in 540 lbs. of water. The mixture was heated to 190° F. with constant stirring, the heat being supplied either directly with live steam or indirectly by jacket steam. The amount of water may be varied by experiment either up or down, depending upon the method of heating used, so that some of the water may be added as cooling water to bring the temperature down to 140° F., although it is just as feasible to add more water and to cool by means of cold water circulating in the jacket.

After heating to 190° F. and diluting with, say, 180 lbs. of water, then cooling to 140° F., the suspension was ready for addition to the clay slip or pigment which was prepared as follows:

Approximately 1000 lbs. of coating clay were agitated with 750 lbs. water for 1 hour. A deflocculating agent consisting of 5 lbs. of 33° Bé. sodium silicate dissolved in 10 lbs. of water was then added. After this had been thoroughly mixed for from 30 minutes to 1 hour, the starch gum suspension was mixed in thoroughly, along with any wetting agent or deformer, if necessary. The coating color thus obtained may be diluted to any desired viscosity. For example, dilution to a total solids content of 35% to 40% will bring the viscosity to that range usually desired for brush coating.

The coating obtained on paper with this coating color will compare favorably with that obtained with other starches, e. g., oxidized starches and enzyme converted starches. One of the most important tests made by the coated paper mills is the so-called wax or pick test. Two series of waxes are commonly used, one being the Dennison series of waxes and the other the K and N series. The results obtained with my product will vary slightly, depending upon the starch base used and the kind of paper coated.

In the following description the wax tests refer to Dennison waxes. Coating colors were made up as described above, with the exception that 20% of starch was used to very 100 parts of clay, and using the products made in Examples I, II and III. The resulting viscosities were approximately the same. The results are tabulated.

Coating color

| Product | Corn | Tapioca | Potato |
|---|---|---|---|
| Percent solids...........per cent.. | 40 | 42 | 41 |
| pH.................................... | 7.50 | 7.55 | 7.45 |

Coated paper #1

| | | | |
|---|---|---|---|
| Coat weight.....................lbs.. | 15 | 15 | 15 |
| Pick on wax No................ | 5,5,6 | 6,6,6 | 7,7,7 |
| Av. pick on wax No........... | 5.3 | 6.0 | 7.0 |

Coated paper #2

| | | | |
|---|---|---|---|
| Coat weight.....................lbs.. | 10 | 10 | 10 |
| Pick on wax No................ | 6,6,6 | 6,6,7 | 7,7,7 |
| Av. pick on wax No........... | 6.0 | 6.3 | 7.0 |

Generally speaking, in most instances the starch gums derived from the root starches, as, for example, tapioca and potato, give products of greater adhesive value and give more uniform results with regard to various grades of paper to to be coated than the starches derived from grains, as, for example, corn.

When the paper has a very hard size, however, improved results have been obtained by employing as the predominant adhesive base for the coating color a starch gum derived from corn-starch. On the hard sized paper higher wax tests have been obtained with the corn starch gum than with a chlorinated corn-starch of similar viscosity. Apparently this is due to the presence in the corn-starch of some material which undergoes a different modification when converted to a starch gum than when chlorinated. In any event, regardless of the theory, marked differences in results have been obtained.

EXAMPLE V

This example is given to illustrate the preparation of an adhesive base for the coating color derived from corn-starch. The adhesive base was prepared by spraying onto 2000 lbs. of corn-starch 570 cc. of 18° Bé. hydrochloric acid dissolved in 1000 cc. of water. The product was converted under the same temperature conditions as in Example I but the conversion was stopped sooner so that the final product when mixed with 4 parts of water, heated to 190° F. and cooled to 75° F. gave a viscosity of approximately 30 seconds on a Stormer viscosity cup using a 500 gram weight. When this product was made up into a coating color in a manner similar to that previously described, the following results were obtained on the pick test:

Coating color

| | | |
|---|---|---|
| Solids...........................per cent.. | 35 | |
| pH................................ | 7.7 | |
| Coated paper.................. | #3 | #2 |
| Coat weight..................lbs.. | 10 | 10 |
| Pick on wax No................ | 2,3,3 | 4,5,5 |
| Pick on average wax No..... | 2.6 | 4.6 |

In Example V it will be noted that the amount of acid employed is the same as in Example I. As a general rule, it is preferable to vary the amount of acid used according to the viscosity desired in the end product. The type of starch gum used as the adhesive base for coating may also depend upon the method of coating used. The products previously described in the examples are suitable for the brush type and roll type coating. For that type of coating known to the art as "machine coating" a somewhat different type of product may be employed, as illustrated in the following example:

EXAMPLE VI

Approximately 2000 lbs. of corn-starch were sprayed with 325 cc. of 18° Bé. hydrochloric acid dissolved in 1000 cc. of water. The starch was converted in the manner described in Example I and the conversion was stopped at the point where the final product when mixed with 6½ parts of water, heated to 190° F. and cooled to 75° F. gave a viscosity of approximately 30 seconds on a Stormer viscosimeter, using a 500 gram weight and the high viscosity cup.

A coating color was prepared from this product by mixing the product with 3 or 4 parts of water and cooking with indirect steam and with suitable agitation. The coating color was made up to contain 50% to 60% total solids. In this type of coating 18% of starch gum based on the clay was employed.

In making up coating colors for machine coating, the clay must of necessity be made up with small amounts of water, but this is a matter which is well known by the individual manufacturer and requires no further discussion.

Coating compositions prepared in accordance with the present invention preferably contain 30% to 60% solids. The amount of starch gum employed as the adhesive base is preferably within the range of 15% to 30% based on the weight of the pigment.

The type of pigment employed is subject to variation. In the examples the use of a clay pigment has been mentioned, but it will be understood that other pigments such as calcium carbonate, titanium dioxide, zinc sulfide, lithopone and various mixtures may be used.

In making up the coating color many of the auxiliary agents now employed in the art may be used, as for instance, deflocculating agents such as soda ash, silicate of soda, sodium pyrophosphate, and other substances, as well as wetting agents or defoamers.

The starch gum may be derived from any starch, including tapioca, potato, sweet potato, sago, corn, rice, oats, wheat, rye and barley.

The invention provides a new and improved type of coating color or paper coating composition which can be prepared more cheaply than coating compositions prepared with amylaceous adhesives heretofore in use. Good results have been obtained by the use of coating colors prepared in accordance with this invention.

Having thus described the invention, what I claim as new and desire to secure by Letters Patent of the United States is:

1. An amylaceous substance suitable for use as a pigment binder in paper coating, said amylaceous substance being a low soluble white starch gum having a solubility within the range of about 1% to about 20% in water at 25° C. and a viscosity characteristic such that it will give a viscosity reading of 30 seconds on a Stormer viscosimeter using a 500 gram weight and the high viscosity cup when dispersed in water in proportions within the range of 1 part of said starch gum to 2–7½ parts of water with heating to 190° F. followed by cooling and testing at 75° F., and said starch gum being obtainable by roasting a starch under substantially dry conditions at temperatures within the range of 350° F. to 450° F. in the presence of not more than 0.1% of a non-dehydrating acid based on the weight of the starch for a period less than that at which the color change from white to brown normally occurs.

2. A coating composition comprising a low soluble white starch gum having a solubility within the range of about 1% to about 20% in water at 25° C. and a viscosity characteristic such that it will give a viscosity reading of 30 seconds on a Stormer viscosimeter using a 500 gram weight and the high viscosity cup when dispersed in water in proportions within the range of 1 part of said starch gum to 2–7½ parts of water with heating to 190° F. followed by cooling and testing at 75° F., and said starch gum being obtainable by roasting a starch under substantially dry conditions at temperatures within the range of 350° F. to 450° F. in the presence of not more than 0.1% of a non-dehydrating acid based on the weight of the starch for a period less than that at which the color change from white to brown normally occurs.

3. A paper coating color comprising a coating pigment and containing as the predominant adhesive component a low soluble white starch gum having a solubility within the range of about 1% to about 20% in water at 25° C. and a viscosity characteristic such that it will give a viscosity reading of 30 seconds on a Stormer viscosimeter using a 500 gram weight and the high viscosity cup when dispersed in water in proportions within the range of 1 part of said starch gum to 2–7½ parts of water with heating to 190° F. followed by cooling and testing at 75° F., and said starch gum being obtainable by roasting a starch under substantially dry conditions at temperatures within the range of 350° F. to 450° F. in the presence of not more than 0.1% of a non-dehydrating acid based on the weight of the starch for a period less than that at which the color change from white to brown normally occurs.

4. An amylaceous substance as claimed in claim 3 in which said low soluble white starch gum is derived from a corn starch.

5. An amylaceous substance as claimed in claim 1 in which said low soluble white starch gum is derived from tapioca flour.

6. An amylaceous substance as claimed in claim 1 in which said low soluble white starch gum is derived from potato starch.

HERBERT F. GARDNER.